Jan. 1, 1929.

R. P. LANSING 1,697,393

SHOCK ABSORBER AND SPRING CONTROL FOR VEHICLES

Filed May 15, 1924  2 Sheets-Sheet 1

INVENTOR
Raymond P. Lansing
BY
ATTORNEY

Jan. 1, 1929.

R. P. LANSING 1,697,393

SHOCK ABSORBER AND SPRING CONTROL FOR VEHICLES

Filed May 15, 1924 2 Sheets-Sheet 2

INVENTOR
Raymond P. Lansing
BY
ATTORNEY

Patented Jan. 1, 1929.

1,697,393

UNITED STATES PATENT OFFICE.

RAYMOND P. LANSING, OF MONTCLAIR, NEW JERSEY.

SHOCK ABSORBER AND SPRING CONTROL FOR VEHICLES.

Application filed May 15, 1924. Serial No. 713,533.

This invention relates to shock absorbers or spring controllers for vehicles.

An important object of the invention is the provision of an appliance of this class which opposes a predetermined maximum resistance to relative movement of the vehicle body and axle in one direction, and builds up this maximum resistance very quickly after the stated movement commences, and which opposes a substantially smaller, and usually a very much smaller frictional resistance to movement of the vehicle body and axle in the other direction, the respective resistances being, preferably, substantially uniform through the greater part of the stated movements.

A further object is to produce the above stated effects or results in an appliance in which the friction members have an oscillating or rotative movement about an axis, and further, to produce the friction effects by the action of a spring or springs in conjunction with inclined surfaces, such as screw threads, which control or modify the spring action.

A further object is to properly provide for moderate relative vehicle body and axle movement, as when the vehicle is traveling over approximately smooth surfaces, by providing a comparatively small friction resistance to such movements in either direction within a limited range, or, in some cases, practically or entirely eliminating resistance in one direction of relative movement.

A further object is to avoid resistance to return movement of the vehicle axle in relation to the body, after it has moved in one direction, and especially to avoid such resistance at the beginning of the return movement; and in attaining this object, the means employed may be such that instead of offering any resistance to the initiation of the return movement, such movement may be, and preferably is, actually facilitated.

Another object is to provide different friction members or surfaces, which have different friction values, for reasons sufficiently explained hereafter.

Another object is to provide a novel clearance or lost motion arrangement or effect, in connection with the means for providing a relatively free period or range of movement as referred to above, this clearance arrangement being provided in connection with a traveling member which co-operates with a yielding element or spring which is active or inactive in different positions of the traveling member, usually identified hereafter as a shifter.

The structures embodying the invention are in some respects similar to those disclosed in my companion application executed this day, with important modifications and improvements.

The characteristics and advantages of the invention are further sufficiently explained in connection with the following detail description of the accompanying drawing, which shows certain exemplifying embodiments. After considering these, skilled persons will understand that many variations may be made within the scope of the invention, and I contemplate the employment of any structures that are properly within the scope of the appended claims.

A base plate 1 has a central portion of moderate diameter and extensions 2 for the connection of two studs 3 by which the device may be connected to a vehicle frame member; otherwise the base plate may be connected to a lever arm which is in turn connected to a vehicle part. Such variations in mounting are well known and will not be further mentioned.

At the center of the base plate is a sleeve 4 having its outer end slotted or in any suitable way provided with lugs 5. An annular friction disc 6 is located on a flat outer face of the base plate around sleeve 4. This friction disc, for reasons to be stated, is preferably of moderate diameter and is also of material which has a moderate or low friction coefficient, such, for instance, as hard fiber. Desirably a dirt or water excluding washer 7 of suitable material, such as felt, is placed about the periphery of the friction ring, the base plate being provided with an annular recess 8 to accommodate the washer, and the washer being further located or retained by an annular flange 9.

A central spindle 10 might be formed integral with the base plate, but for manufacturing economy and other reasons, it is usually separate and so dimensioned that its main portion has a sliding or moderately tight fit in the bore of sleeve 4, and the portion of the spindle within the sleeve may be longitudinally knurled or toothed as at 11 to prevent rotation, although there is no considerable force tending to rotate the spindle, and such forces may be provided against any other ways. The spindle has a head 12 accommodated in a counterbore in the inward face of the base plate. The outward portion 13 of the spindle may be of reduced diameter and is provided with a screw thread 14.

A plate 16 has a central bore engaging around sleeve 4 with a bearing fit. The inward face of the plate, or the central area thereof, is flat and engages the outer face of annular friction disc 6. A part of the outer surface of the plate is formed or arranged as a friction surface 18. A shifter or nut 20 has a bearing fit on the main portion of spindle 10 and is arranged for moderate axial movement on the spindle and restrained from rotation by means of lugs 21 interfitting and cooperating with lugs 5 on the end of sleeve 4. The ends of one set of lugs are usually arranged or dimensioned to engage against surfaces of the other member between its lugs, and the lugs on the last named member are arranged to provide a clearance between their ends and the adjacent surfaces of the other member; thus, in the particular arrangement shown, the ends of lugs 5 bear on end portions of nut 20 between the nut lugs 21, and the ends of the nut lugs provide a clearance from the confronting surfaces of sleeve 4. In this, or any other suitable way, provision is made for a definite seating of the nut upon the sleeve end. The nut has on its outer surface screw threads 25, the pitch angle of which may vary considerably, but in a particular case may be approximately 30° (more or less). The nut also has a flange 27 adjacent lugs 21.

Another plate 30 which may be identified as a friction plate, or otherwise as a clutch plate, has its central bore provided with screw threads 31 properly fitting nut threads 25. On the inward face of the plate is a friction surface 32. Adjacent the friction surface, is an annular series of lugs or jaws 33 interfitting with similar jaws 34 on plate 16, the ends of these jaws being arranged to provide clearance for necessary convergent plate movement referred to below. The face 36 of plate 30, adjacent its screw threads, is arranged confronting the outward face of flange 27 and with moderate but substantial clearance for purposes hereafter explained.

By the described arrangement of parts, an annular space 37 is left around lugs 5 and 21, and between flange 27 and plate 16, and when desired a filler ring 38 may be inserted in this space, this ring being dimensioned so that it does not interfere with the proper seating of nut 20 on the end of sleeve 4. This ring may be provided mainly to confront or cover rough edges of screw thread formations when the threads are cut, as is usually convenient or necessary, through flange 27.

A friction plate 40 is located between the friction surfaces of plates 16 and 30, this plate being usually formed as a part of an arm or lever 41, the outer end of which has a ball fitting 42 for connection by means of a suitable link to a vehicle part, namely, the axle, when base plate 1 is secured or connected to a frame member. Plate 40 has on opposite surfaces annular friction discs or rings 45 and 46 of suitable material, such as is usually known in the trade as asbestos fabric or composition, or any other material suitable for the purpose, it being desirable that these friction rings shall have a relatively high friction coefficient, usually the highest that is practicable, consistent with other qualities, such as durability. These friction rings are also desirably of considerably greater diameter than the friction disc or ring 6, and they are secured to plate 40 by rivets 47, although in some cases, the friction rings may not be positively connected to the plate and in that case frictional movement might occur between the plates and the ring surfaces, as well as between the rings and the friction surfaces of the plates 16 and 30. Plate 40 with its arm 41, may be centered for oscillation about the spindle in any suitable or convenient way. In the present instance, it is rotatively centered by a flange 50 on plate 16, engaging the periphery of friction ring 46.

A spring 55, usually in helical form and of moderate pressure value is arranged with one end bearing on an outer surface of plate 30, and with the other end bearing against a nut 56, engaging screw thread 14 and secured in adjusted position by a lock nut 57. A relatively heavier or high pressure spring 60 is located inside of spring 56, and is compressed between nut 56 and a seat or shoulder $10^a$ formed on the spindle around the base of the reduced portion 13. The inward end of spring 60 is arranged so that it extends outward substantially beyond the spindle and confronts the outer end of shifter 20 with a substantial clearance which is usually less than the clearance between flange 27 and plate portion 36 previously mentioned. These respective clearances though definite and substantial are quite small and are probably somewhat exaggerated in the drawing, for illustrative clearness. The purpose and function of these clearances are fully explained below.

While the weatherproof enclosure of the device does not directly affect its operation, it is desirable for obvious reasons. This is provided for in the present instance by a housing or cover 70 of pressed sheet metal, having a portion enclosing the outer portion of the spindle and the spring, a flat annular portion 71 overlying a portion of plate 30 with substantial clearance to permit necessary slight outward movement of the plate, a portion 73 surrounding the plate periphery, and a flat annular portion 74 secured to plate 40 by screws 72, and usually a gasket 74ª is interposed between the housing member 74 and plate 40 to complete the oil, moisture, and dirt-proof enclosure of all the outer portion of the appliance. At the opposite face of plate 40 is a washer 81, of felt or other suitable compressible material, retained or located by a flange 82 on plate 16, and in addition by flange 50 previously mentioned.

The described structure or arrangement provides for easy assembly, merely by placing one part over another or slipping one member through another, in an obvious way.

The appliance may be arranged to oppose the greatest resistance to convergent or divergent movement of the vehicle axle and body. It will be sufficient in explaining the operation to assume that the appliance is attached to the vehicle in such a way as to oppose the greatest resistance to divergent movement of the axle and body, or in other words, to spring recoil, since, in many cases, it is considered most important to more vigorously check that movement, with a small or in some cases practically a negligible degree of checking in the opposite or vehicle spring compression movement. When the appliance is so arranged, and with a right hand lead of the screw threads 25 as shown, the action is as follows:

Spring 55 constantly exerts a pressure tending to move plate 30 toward plate 16 and to clamp plate 40 between them, by engagement of the friction surfaces 32 and 18 with the friction rings of plate 40, and also tending to move both of the plates 30 and 16 bodily toward the base plate 1 so that the friction surface of plate 16 bears on the outer surface of friction ring 6. The clearance between the lugs or jaws 33 and 34 of the respective plates 16 and 30, is sufficient to allow for ample convergent movement of the plates, or, in other words, to insure proper frictional contact and allow for wear of the surfaces.

Figure 2:
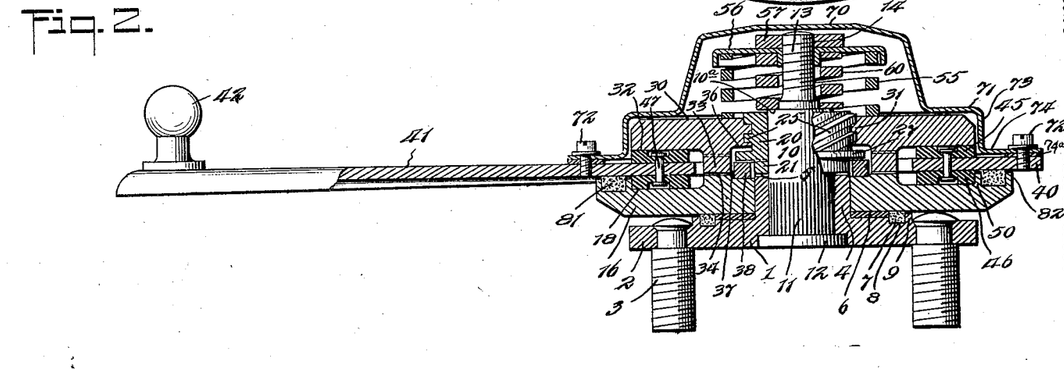
Fig. 2 is a horizontal section.

The jaws connect the plates so that whenever one rotates the other must move with it. Heavy spring 60 normally seats on spindle shoulder 10ª with the above mentioned clearance between the spring and the end of nut 20, so that in a normal or neutral position of the parts as shown in Fig. 2, the thrust of spring 60 is ineffective or self-contained between the shoulder and abutment 56. With the nut or shifter 20 in the inward position as shown, the full or normal clearance exists between flange 27 and plate surface 36.

Figure 1:
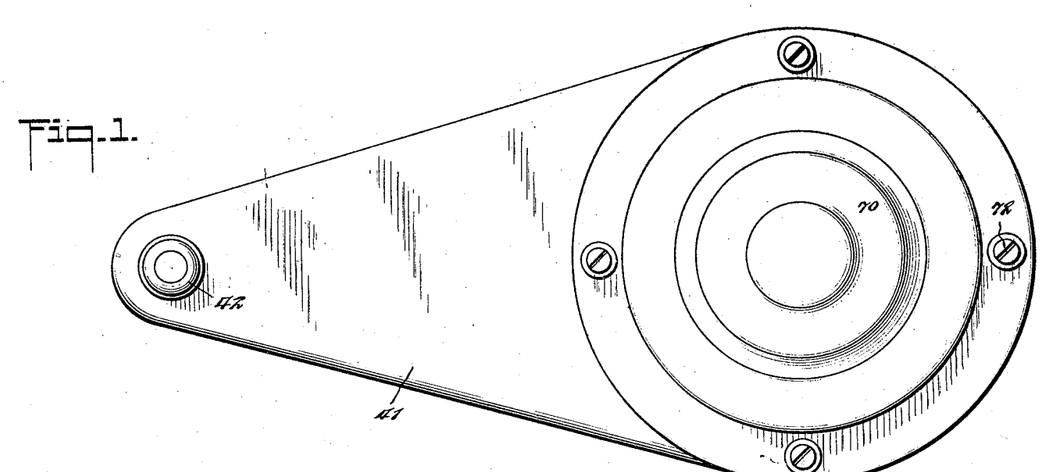
Fig. 1 is a side elevation of a structure embodying the invention in one form.

When the vehicle wheel hits a road bump the axle moves upward in relation to the body or chassis frame, and in the above stated arrangement of the controlling appliance, arm 41 is moved left handed in Fig. 1, or its ball end 42 moves toward the eye as viewed in Fig. 2. Since plate 40 is frictionally gripped between plates 30 and 16, and since friction ring 6 is of relatively small diameter and has a relatively low friction coefficient, in the first small part of the stated movement (if the total movement is considerable) plates 40, 30 and 16 move together, with friction resistance exerted only between friction ring 6 and plate 16, this being the resultant of the friction coefficient and average radius of the friction surface, and the pressure of spring 55, which as stated, is preferably moderate. The described condition and movement continue until the clearance of threads 25 and 31 is taken up. If the movement continues the angle of the screw threads tends to move plate 30 outward or away from plate 16, or otherwise stated, the effective pressure of spring 55 is reduced so that slippage occurs between rings 45 and 46 and plates 30 and 16, and concurrently the plates cease to rotate on account of the screw thread engagement between plate 30 and the irrevoluble nut, and the connection between plates 30 and 16. The friction resistance thus afforded to the movement of plate 40 is of relatively small value, being proportional to the reduced effective pressure of spring 55, but is greater than the resistance provided by slippage only at the surface of ring 6 in the earlier part of the vehicle spring compression movement.

When at the end of the vehicle spring compression movement, the vehicle spring commences to react and move the axle away from the vehicle body, in the first small angular movement of arm 41, plates 30 and 16 grip plate 40 and travel with it, and friction resistance occurs only between plate 16 and friction ring 6, this friction corresponding to the full pressure value of spring 55. At the end of a small angular movement of the arm, thread clearance is taken up and the outward faces of the screw threads 31 bear against the inward faces of the nut threads 25. The next slight movement of the arm in the same direction causes the nut or shifter 20 to be "lifted" or moved outward, and in the first slight movement of the nut it is separated from its seating against the end of sleeve 4 and travels outward without resistance until the clearance between the nut and the inward end of spring 60 is taken up. The nut then commences to "lift" the spring end from its seat, and during a small angle of arm movement the work required to lift or compress the spring adds materially to the resistance opposed to arm movement and so to the vehicle spring recoil. Until spring 60 is sufficiently compressed to exert considerable or practically its maximum resistance to the outward nut movement and until nut flange 27 engages plate 30, plates 16 and 30 continue to move along with plate 40 by their frictional engagement. The whole travel of arm 41 from the beginning of the recoil up to the point where the spring is raised substantially from its seat and exerts practically its full pressure through nut 20 upon the various plates and friction surfaces, may be described for convenience as the "wind-up movement" or period; or in a more particular sense the actual spring windup period may be considered to be that part of the arm movement from the time when the outer end of the nut encounters the spring end and begins to lift it, to the moment when flange 27 engages plate 30, and rotative movement of plates 30 and 16 is thereby stopped.

During all of the movement of arm 41 during vehicle spring recoil up to the point of flange engagement just mentioned, the friction resistance to such movement is quite small, being due only to the rotative slippage on the surface of friction disc 6, which has a small friction value or coefficient as above explained, and being produced only by the pressure of the relatively weak spring 55, up to the time when the nut commences to lift the main or heavy spring 60, and from that point to the end of the windup period, slippage still continues to occur only on the surface of ring 6, although with a greater frictional resistance due to the added pressure value of spring 60.

At the end of the windup period, indicated by engagement of flange 27 with surface 36 of plate 30, further rotative movement of plates 30 and 16 is prevented by their engagement with the irrevoluble nut. The full pressure value of both springs continues to be exerted through the nut and plate 30 on the friction surfaces 32 and 18, which immediately become active by the continued movement of plate 40 and its friction rings, of relatively large average diameter and area, and of a relatively high frictional coefficient. The maximum friction retarding effect is thus applied after the preliminary stages or angles of movement, which taken together, are relatively small in comparison to any considerable total rebound movement, and the full friction value remains constant through the remainder of the rebound stroke.

When the described axle movement ceases, the parts of the appliance are in the just above described active condition in distinction from the comparatively passive or neutral condition of the parts shown in Fig. 2; that is to say, nut 20 is off of its seat against shoulder 10ª, and spring 60 is actively bearing on the nut and through it upon plate 30 and all the friction surfaces, and the full spring pressure is, of course, applied to the screw thread surfaces. On account of the general construction and arrangement of parts, the screw thread angle may be made such that the screw thread reaction of the nut, as urged by spring 60, has a very substantial tendency to rotate plate 30 and the connected plate 16. In a particular case, as above stated, the thread angle may be approximately 30°, about as indicated in Fig. 2, from which it will be apparent that the wedging action effective to rotate plate 30, is very considerable. The tendency or ability of the main spring acting through the nut to rotate plates 30 and 16 is materially enhanced by the fact that during the stated part of the vehicle spring compression movement plates 40, 30 and 16 move together by frictional engagement, and frictional slippage occurs only at the surface of ring 6, this friction resistance being relatively small or in some cases almost negligible on account of the small friction value at that surface. Therefore, at the beginning of the next axle movement toward the vehicle body, which will usually quickly follow a considerable divergent movement, such as just above described, there is no resistance by the shock absorber appliance to such axle return or vehicle spring compression, but on the contrary the above mentioned spring and screw effect urges plates 30, 16 and 40 in the desired direction and tends to expedite the stated axle movement. This condition and movement continue until spring 60 is again seated on shoulder 10ª. The rotative effect due to spring 60 and the nut, thereupon ceases and spring 60 becomes inactive with its thrust taken up or practically self-contained between nut or abutment 56 and the spindle shoulder, and the spring remains in this condition until another considerable vehicle spring recoil movement.

Continuing the described vehicle spring compression movement, plates 30 and 16 continue to travel along with plate 40, with friction resistance occuring only at the surface of ring 6, and being due only to the pressure of the constantly acting spring 55, and nut 20 continues to move inward while the clearance between flange 27 and plate 30 is reestablished, until the nut seats on the end of sleeve 4. The parts have now come to the end of an angle or period of movement corresponding substantially to the reverse of the previously described complete windup movement, or in other words, the end of the relatively free period or angle of movement has been reached in the direction of vehicle spring compression. When such compression movement is considerable, arm 41 continues to move in the same direction, and the thread clearance being taken up, screw threads 25 exert a lifting effect on plate 30 which is moved outward against spring 55 sufficiently to cause the connected plates 30 and 16 to become stationary, and then friction resistance to the arm movement is produced at the surfaces of both of the friction rings 45 and 46, this resistance being of substantial value and decidedly greater than the resistance occuring during the free period because there is slippage at two surfaces, each of which has a greater friction value than that of ring 6, and this frictional resistance being produced, of course, only by the constantly acting spring 55; the effect of this spring is, however, under the stated condition modified by the screw thread action, or in other words, by the lifting of plate 30, so that the effective spring pressure is materially reduced in the stated direction of movement. This condition continues to the end of the stated arm movement.

While it is probably impracticable or impossible, in a practical appliance or one employing the general principle of operation here disclosed, to entirely eliminate friction resistance to the vehicle spring movement, while that movement is confined to narrow limits while the vehicle is running on smooth roads, nevertheless, as will be understood from the preceding description, the friction resistance at such times, and especially in one direction of movement (which may be either direction, but is usually the vehicle spring compression movement) may be moderate or very small in relation to the maximum friction resistance for which the appliance is designed; for instance, as the vehicle spring compresses on account of a minor road surface irregularity, arm 41 may move counterclockwise only through a range corresponding to the thread clearance or the clearance between nut 20 and spring 60, and in that case the friction resistance is limited to that provided by spring 55 acting on the area of contact between plate 16 and friction ring 6, which offers small friction resistance, for reasons above stated; or if the movement is somewhat greater, plate 30 will be slightly retracted and slippage will occur between the main friction rings and plates 16 and 30 for a short travel of the arm. Under similar conditions the vehicle spring recoil movement may be limited to a distance corresponding to the clearance of threads 25 and 31, and in that case, the retarding friction is limited to that afforded by spring 55 acting on the surface of plate 16 in contact with friction ring 6; or, if the stated movement is somewhat more extensive, it may include more or less of the above mentioned windup period, during which spring 60 is lifted or moved away from its seat on shoulder 10ª, whereupon the pressure of spring 60 is added to that of spring 55, but is still effective only on the single friction surface of small area and small frictional coefficient. Therefore, the appliance may be so constructed or arranged that the vehicle will ride smoothly on comparatively smooth roads, but if rougher roads with greater spring deflection are encountered, the appliance will automatically act to quickly build up and oppose a very substantial and entirely adequate friction resistance to extensive rebound movements, and a much smaller resistance to extensive spring compression movements, and if at any time a small spring movement or "jiggle" occurs, it will be permitted with reasonable or slight resistance. The references to directions of relative movement of the vehicle axle and body may evidently be interchanged through the operative description, since, as previously stated, the appliance may be arranged to oppose the greatest resistance to either vehicle spring recoil or compression.

Figures 3, 4, 5:
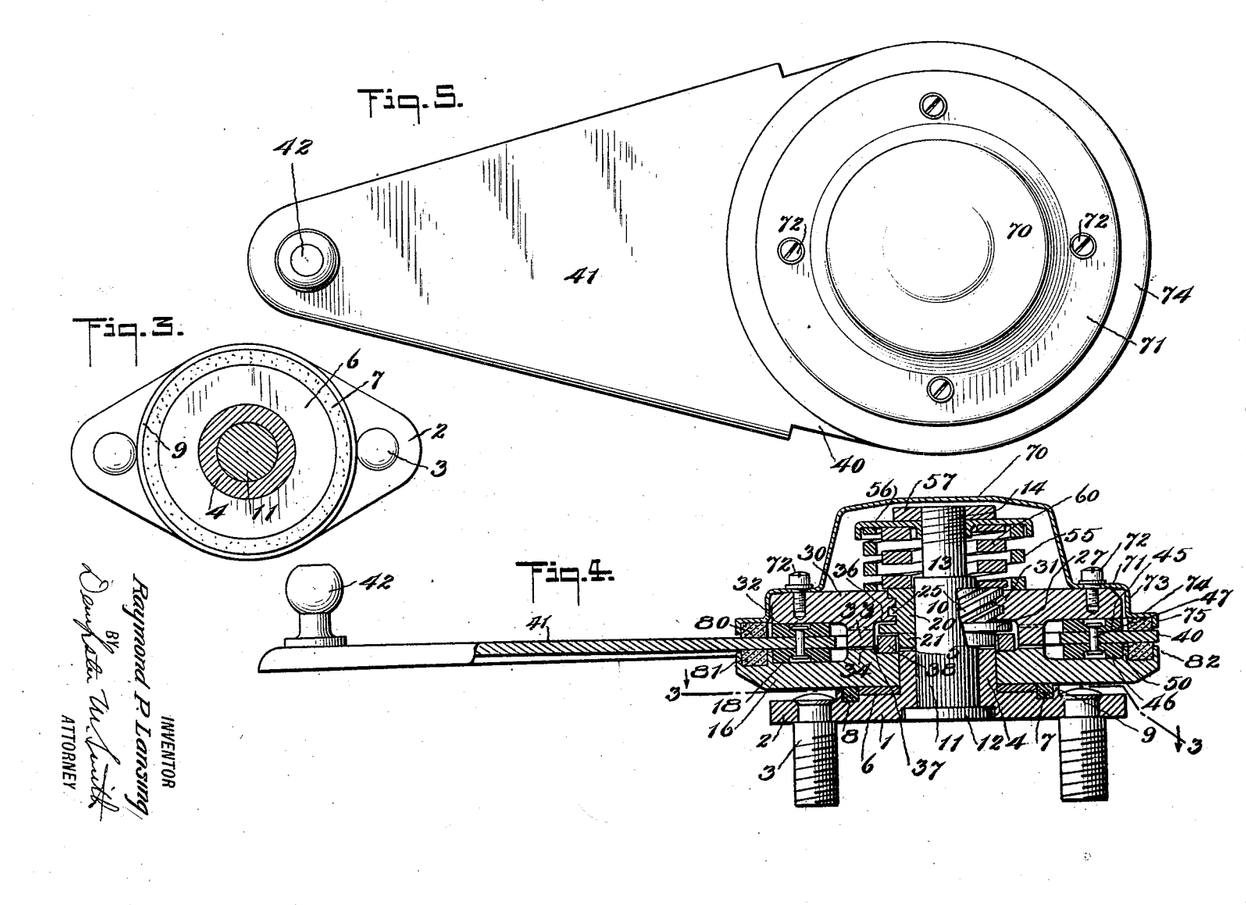
Fig. 3 is a sectional detail showing principally the main friction member or base plate and certain associated parts.
Fig. 4 is a horizontal section of a modified form of the appliance.
Fig. 5 is a side elevation of the same.

While the appliance may be so arranged or devised that screw thread clearance may be depended upon to provide for the main or an important part of the free range of movement above referred to, and such an arrangement is illustrated in Fig. 4, described below, such an arrangement is undesirable for some reasons, especially because, while in practical manufacturing it is necessary to provide an appreciable thread clearance, this clearance tends to increase substantially by wear of the threads. In the structure of Fig. 2 any such undesirable result is avoided by providing clearance between the end of nut 20 and the inward end of spring 60 which provides a definite free range of movement of the nut which is not subject to alteration by wear of the parts.

In the modified structure or arrangement shown in Figs. 4 and 5, the inward end of the main spring 60 is always in engagement with the outer end of nut 20. When the parts are in a neutral position as shown, the thrust of the spring is self-contained or taken up by the nut which is seated against the end of sleeve 4. In this arrangement the compression of spring 60 commences when arm 41 moves clockwise, as soon as screw thread clearance is taken up. The free angle or period must therefore be largely or entirely provided for in the screw thread clearance and while this is subject to some variation as above mentioned, because of the wear of the thread, such a variation within reasonable limits is not objectionable, and the appliance will operate satisfactorily for a large vehicle mileage, especially if the threads are properly lubricated.

Figs. 4 and 5 also show another modification consisting in the attachment of housing 70 to plate 30 by screws 72. In this arrangement the housing must move along with plate 30, and has movement at times in relation to plate 40. Another packing ring 80 similar to ring 81 is therefore provided at the opposite surface of plate 40, this ring being compressed under the housing portion 74 and retained against lateral displacement by a shallow flange 75 formed at the periphery of the housing.

I claim:

1. An appliance of the character described, comprising movable members certain of which have surfaces in frictional engagement, certain of said surfaces having different friction values, and means acting during a part of a relative movement of certain of said members in one direction to produce frictional movement at certain of said surfaces and also acting during another part of the same movement to produce frictional movement at other of the friction surfaces.

2. An appliance of the character described, comprising relatively movable members having surfaces in frictional engagement, certain of said surfaces providing a different friction value than other of said surfaces, means for applying pressure to the friction surfaces, and means acting to control said pressure applying means and also acting during a part of a relative movement of certain of said members in one direction to produce frictional movement at certain of said surfaces and during another part of the same movement to produce frictional movement at other of the friction surfaces.

3. An appliance of the character described, comprising relatively movable members having surfaces in frictional engagement, one of said surfaces providing a different friction value than other of said surfaces, means for applying pressure to the friction surfaces, and means controlled by relative movement of certain of said members for regulating the action of said pressure applying means to cause at times a frictional movement at one of said friction surfaces and at other times a frictional movement at another of said friction surfaces.

4. An appliance of the character described, comprising relatively rotatable members having certain surfaces in frictional engagement, certain of said surfaces providing a different friction value than other of said surfaces, yieldable means for applying pressure to the friction surfaces, and means for causing frictional movement at times at one of said surfaces and at other times at another of the surfaces.

5. An appliance of the character described, comprising relatively rotatable members having certain surfaces in frictional engagement, certain of said surfaces providing a different friction value than other of said surfaces, spring means for applying pressure to the friction surfaces, and means for causing frictional movement at times at one of said surfaces and at other times at another of the surfaces.

6. An appliance of the character described, comprising relatively rotatable members having certain surfaces in frictional engagement, certain of said surfaces providing a different friction value than other of said surfaces, springs for applying pressure to the friction surfaces, and means for causing frictional movement at times at one of said surfaces and at other times at another of the surfaces.

7. An appliance of the character described, comprising relatively rotatable members having certain surfaces in frictional engagement, certain of said surfaces providing a different friction value than other of said surfaces, yieldable means for applying pressure to the friction surfaces, and means controlled by relative movement of said members for controlling the action of said yieldable means to cause at times a frictional movement at certain of said friction surfaces and at other times a frictional movement at other of said surfaces.

8. An appliance of the character described, comprising members adapted for connection to relatively movable parts of a vehicle to control the vehicle spring action, another member arranged for movement relative to the members first mentioned, various of the members having friction surfaces, means acting upon the members to produce pressure at the friction surfaces, and controlling means actuated by movement of certain of said members and serving to control the action of said pressure producing means to vary the effective pressure at the friction surfaces under different operative conditions.

9. An appliance of the character described, comprising members adapted for connection to relatively movable parts of a vehicle to control the vehicle spring action, other members arranged for movement relative to the members first mentioned, various of the members having friction surfaces, means acting upon the members to produce pressure at the friction surfaces, and controlling means actuated by movement of certain of said members and serving to control the action of said pressure producing means to vary the effective pressure at the friction surfaces under different operative conditions.

10. An appliance of the character described, comprising members adapted for connection to relatively movable parts of a vehicle to control the vehicle spring action, other members arranged for movement relative to the members first mentioned, the various members having friction surfaces, yieldable means for urging the members to produce pressure at the friction surfaces, and controlling means actuated by relative movement of certain of said members and serving to control and modify the action of said yieldable means to vary the effective pressure at the friction surfaces under different operative conditions.

11. An appliance of the character described, comprising members adapted for connection to relatively movable parts of a vehicle to control the vehicle spring action, other members arranged for movement relative to the members first mentioned, the various members having friction surfaces, spring means for urging the members to produce pressure at the friction surfaces, and controlling means actuated by relative movement of certain of said members and serving to control and modify the action of said spring means to vary the effective pressure at the friction surfaces under different operative conditions.

12. An appliance of the character described, comprising members arranged for relative oscillation and adapted for connection to relatively movable parts of a vehicle to control the vehicle spring action, other members arranged for oscillation relative to the members first mentioned, various of the members having friction surfaces, spring means acting upon the members to produce pressure at the friction surfaces, and controlling means actuated by relative movement of certain of said members and serving to control or modify the action of said spring means to vary the effective pressure at the friction surfaces under different operative conditions.

13. An appliance of the character described, comprising two members arranged for relative to-and-fro oscillation and adapted for connection to relatively movable parts of a vehicle to control the vehicle spring action, other members arranged for to-and-fro oscillation relative to both the members first mentioned, the various members having friction surfaces, springs urging the members to produce pressure at the friction surfaces, and controlling means frictionally actuated by relative movement of certain of said members and serving to control or modify the action of said springs to vary the effective pressure at the friction surfaces under different operative conditions.

14. A vehicle spring controlling appliance, comprising a main plate having a friction surface and adapted to be connected to a vehicle part such as an axle or frame member, a spindle extending therefrom, a second plate arranged for rotation about the spindle axis and having friction surfaces and adapted to be connected to the other of said vehicle parts, co-operating plates arranged for rotation about the spindle axis and to frictionally grip the second plate between them, one of said co-operating plates having a surface engaging the friction surface of the plate first mentioned, an irrevoluble shifter arranged for axial movement, inclined surfaces intermediate one of said co-operating plates and the shifter, and spring means for urging the plates to frictional contact and arranged for modification of the spring effect by rotative movement of certain of the plates and co-operative action of one of them and the shifter through said inclined surfaces.

15. A vehicle spring controlling appliance, comprising a main plate having a friction surface and adapted to be connected to a vehicle part such as an axle or frame member, a spindle extending therefrom, a second plate arranged for rotation about the spindle axis and having friction surfaces and adapted to be connected to the other of said vehicle parts, co-operating plates arranged for rotation about the spindle axis and to frictionally grip the second plate between them, one of said co-operating plates having a surface engaging the friction surface of the plate first mentioned, an irrevoluble shifter arranged for axial movement, inclined intermediate surfaces intermediate one of said co-operating plates and the shifter, a spring constantly tending to move the plates to effect frictional contact and arranged for modification of its pressure effect by movement of one of said co-operating plates in relation to the shifter, and another spring arranged to apply heavy pressure to certain of the friction surfaces in one direction of movement and so that its pressure effect is self-contained and ineffective to apply friction pressure in the other direction of movement.

16. A vehicle spring controlling appliance, comprising a base plate having a friction surface and adapted to be connected to a vehicle part such as an axle or frame member, a spindle extending therefrom, a second plate arranged for rotation about the spindle and having friction surfaces and adapted to be connected to the other of said vehicle parts, connected plates arranged for rotation about the spindle and to frictionally grip the second plate between them, one of said connected plates having a surface co-operating with the friction surface of the plate first mentioned, an irrevoluble shifter arranged for axial movement on the spindle; co-operating inclined surfaces on one of said connected plates and the shifter, and spring means for urging the plates to frictional contact and arranged for modification of the spring effect by rotative movement of certain of the plates and co-operative action of one of them and the shifter through said inclined surfaces.

17. A vehicle spring controlling appliance, comprising a main or base plate having a friction surface and adapted to be connected to one of two relatively movable vehicle parts such as an axle or frame member, co-operative clutch plates arranged for rotative movement about an axis of the first plate and connected to move together and also arranged for moderate relative axial movement, another plate frictionally gripped between the clutch plates and adapted to be connected for axial movement, co-operative inclined surfaces between one of the clutch plates and the shifter, and spring means co-operative with the shifter and plates and arranged so that the effective effort of said means is modified by plate and shifter movement in different positions of the clutch plates.

18. A vehicle spring controlling appliance, comprising a main or base plate having a friction surface and adapted to be connected to one of two relatively movable vehicle parts such as an axle or frame member, co-operative clutch plates arranged for rotative movement relative to the first plate, means connecting said plate to move together and admitting of moderate relative axial movement thereof, another plate frictionally gripped between the clutch plates and adapted to be connected to the other of said vehicle parts, a shifter arranged for axial movement, screw threads connecting one of the clutch plates and the shifter, and spring means co-operating with the shifter and plates and arranged so that the effective effort thereof is modified by plate and shifter movement.

19. A vehicle spring controlling appliance, comprising a main or base plate having a friction surface and adapted to be connected to one of two relatively movable vehicle parts such as an axle or frame member, co-operative clutch plates arranged for rotative and slight axial movement relative to the first plate, means connecting said plates to move together and admitting of moderate relative axial movement thereof, another plate frictionally gripped between the clutch plates and adapted to be connected to the other of said vehicle parts, a shifter arranged for axial movement, screw threads connecting one of the clutch plates and the shifter, and spring means co-operating with the shifter and plates and arranged so that the effective effort thereof is modified by plate and shifter movement.

20. An appliance of the character described, comprising a main plate having a friction surface, a spindle centered in said plate and extending therefrom, a nut arranged for axial movement on the spindle and having non-rotative connection to said main plate and arranged to seat in positive relation thereto, a pair of clutch plates arranged for rotative movement about the spindle axis, means connecting the plates to rotate together and admit of moderate relative axial movement thereof, an inclined surface on one of the clutch plates engaging a co-operating element of said nut, another plate frictionally gripped between the clutch plates and adapted to be connected to the other of said vehicle parts, spring abutment on the spindle, a spring stressed between said abutment and the adjacent clutch plate, and a relatively stronger spring stressed between said abutment and the nut.

21. An appliance of the character described, comprising a main plate having a friction surface, a spindle centered in said plate and extending therefrom, a nut arranged for axial movement on the spindle and having non-rotative connection to said main plate and arranged to seat in positive relation thereto, a pair of clutch plates arranged for rotative movement about the spindle axis, means connecting the plates to rotate together and admit of moderate relative axial movement thereof, an inclined surface on one of the clutch plates engaging a co-operating element of said nut, another plate frictionally gripped between the clutch plates and adapted to be connected to the other of said vehicle parts, a spring abutment on the spindle, a spring stressed between said abutment and the adjacent clutch plate, and a relatively stronger spring stressed between said abutment and the nut, the nut and the last named spring being arranged so that in certain operative positions the force of said spring is taken up without pressure effect upon the plates.

22. An appliance of the character described, comprising a base plate having a friction surface, a sleeve extending therefrom, a spindle centered in said sleeve and extending therefrom, a nut arranged for axial movement on the spindle and having non-rotative connection to said sleeve and arranged to seat thereon, a pair of clutch plates arranged for rotative movement about the spindle axis, means connecting the plates to rotate together and admitting moderate relative axial movement thereof, screw threads in a central aperture of one of the clutch plates engaging screw threads on said nut, another plate frictionally gripped between the clutch plates and adapted to be connected to the other of said vehicle parts, an adjustable spring abutment on the spindle, a spring compressed between said abutment and the adjacent clutch plate, and a relatively longer spring compressed between said abutment and the outer end of the nut.

23. An appliance of the character described, comprising a base plate having a friction surface, a sleeve extending therefrom, a spindle centered in said sleeve and extending therefrom, a nut arranged for axial movement on the spindle and having non-rotative connection to said sleeve and arranged to seat thereon, a pair of clutch plates arranged for rotative movement about the spindle axis, means connecting the plates to rotate together and admitting moderate relative axial movement thereof, screw threads in a central aperture of one of the clutch plates engaging screw threads on said nut, another plate frictionally gripped between the clutch plates and adapted to be connected to the other of said vehicle parts, an adjustable spring abutment on the spindle, a spring compressed between said abutment and the adjacent clutch plate, and a relatively strong spring compressed between said abutment and the outer end of the nut, the nut end and the last named spring being arranged so that in certain operative positions the thrust of said spring is taken up without pressure effect upon the plates.

24. A vehicle spring controlling appliance, comprising a plate adapted for connection to a vehicle part such as an axle or chassis frame, a first plate having a friction surface, a second plate relatively rotatable and adapted for connection to the other of said vehicle parts and having friction surfaces at opposite sides, a third and a fourth plate arranged for rotation in relation to the other plates and connected to rotate together and also having provision for moderate relative axial movement to frictionally grip the second plate between them, one of the third and fourth plates having a friction surface co-operating with the friction surface of the first plate, an axially movable shifter, means for preventing rotation thereof, inclined surfaces acting between one of the third and fourth plates and the shifter to move the latter axially at a certain point in the movement of said plate, a spring and a spring abutment, the parts being arranged and adapted so that at times the spring is effective through the shifter to apply pressure to the friction surfaces and at other times the spring effect is self-contained and no friction pressure is produced by it.

25. A vehicle spring controlling appliance comprising a member having a friction surface, clutch mechanism arranged for rotative movement in relation to said member and having a friction surface engaging the surface first mentioned, said clutch mechanism including two members and a third member frictionally gripped between them, and yieldable means urging various of the members to frictional contact.

26. A vehicle spring controlling appliance comprising a member having a friction surface, clutch mechanism arranged for rotative movement in relation to said member and having a friction surface engaging the surface first mentioned, said clutch mechanism including two members and a third member frictionally gripped between them, yieldable means urging various of the members to frictional contact, and means acting upon rotative movement of certain of the members to regulate the pressure effect of the yieldable means.

27. A vehicle spring controlling appliance comprising a member having a friction surface, clutch mechanism arranged for rotative movement in relation to said member and having a friction surface engaging the surface first mentioned, said clutch mechanism including two members and a third member frictionally gripped between them, the friction surfaces intermediate the first named member and the clutch mechanism having a different friction value from the friction surfaces intermediate the relatively movable members of the clutch mechanism, and yieldable means urging various of the members to frictional contact.

28. A vehicle spring controlling appliance comprising a member having a friction surface, clutch mechanism arranged for rotative movement in relation to said member and having a friction surface engaging the surface first mentioned, said clutch mechanism including two members and a third member frictionally gripped between them, yieldable means urging various of the members to frictional contact, means acting upon rotative movement of certain of the members to regulate the pressure effect of the yieldable means, and means acting upon rotative movement of certain of the members to regulate the effect of the yieldable means.

29. A vehicle spring controlling appliance comprising a member having a friction surface, clutch mechanism arranged for rotative movement in relation to said member and having a friction surface engaging the surface first mentioned, said clutch mechanism including two members and a third member frictionally gripped between them, the friction surfaces intermediate the first named member and the clutch mechanism having a different friction value from the friction surfaces intermediate the relatively movable members of the clutch mechanism, yieldable means urging various of the members to frictional contact, and means acting upon rotative movement of certain of the members to regulate the pressure effect of the yieldable means.

30. A vehicle spring controlling appliance comprising a member having a friction surface, clutch mechanism mounted for rotation in relation to said member and having a friction surface engaging the first named surface, said clutch mechanism including two members and a third member frictionally gripped between them, a shiftable controlling member actuated by rotative movement of a clutch element, and yieldable means arranged to exert friction pressure on the members.

31. A vehicle spring controlling appliance comprising a member having a friction surface, clutch mechanism mounted for rotation in relation to said member and having a friction surface engaging the first named surface, said clutch mechanism including two members connected to move together, and a third member frictionally gripped between them, a shiftable controlling member actuated by rotative movement of a clutch element, and yieldable means arranged to exert friction pressure on the members.

32. A vehicle spring controlling appliance comprising a member having a friction surface, clutch mechanism mounted for rotation in relation to said member and having a friction surface engaging the first named surface, said clutch mechanism including two members and a third member frictionally gripped between them, a shiftable controlling member actuated by rotative movement of a clutch element, yieldable means arranged to exert friction pressure on the members and controlled by the shifter action.

33. A vehicle spring controlling appliance comprising a member having a friction surface, clutch mechanism mounted for rotation in relation to said member and having a friction surface engaging the first named surface, said clutch mechanism including two members connected to move together, and a third member frictionally gripped between them, a shiftable controlling member actuated by rotative movement of a clutch element, yieldable means arranged to exert friction pressure on the members and controlled by the shifter action.

34. A vehicle spring controlling appliance comprising a plate having a friction surface, clutch mechanism mounted for rotation in relation to said plate and having a friction surface engaging the plate friction surface, said clutch mechanism including two plates and a plate frictionally gripped between them, spring means urging the various members to frictional contact, and means acting upon rotative movement of certain of the members to regulate the spring effect.

35. A vehicle spring controlling appliance comprising a plate having a friction surface, clutch mechanism mounted for rotation in relation to said plate and having a friction surface engaging the plate friction surface, said clutch mechanism including two plates and a plate frictionally gripped between them, spring means urging the various members to frictional contact, the friction surfaces intermediate the first named plate and the clutch mechanism having a different friction value from the friction surfaces intermediate the clutch plates and the plate gripped between them, and means acting upon rotative movement of certain of the members to regulate the spring effect.

36. A vehicle spring controlling appliance comprising a plate having a friction surface, clutch mechanism mounted for rotation in relation to said plate and having a friction surface engaging the plate friction surface, said clutch mechanism including two plates and a plate frictionally gripped between them, spring means urging the various members to frictional contact, the friction surfaces between the first named plate and the clutch mechanism being of smaller average radius than the friction surfaces intermediate the clutch plates and the plate gripped between them, and means acting upon rotative movement of certain of the members to regulate the spring effect.

37. A vehicle spring controlling appliance comprising a plate having a friction surface, clutch mechanism mounted for rotation in relation to said plate and having a friction surface engaging the plate friction surface, said clutch mechanism including two plates and a plate frictionally gripped between them, spring means urging the various members to frictional contact, the friction surfaces between the first named plate and the clutch mechanism having a smaller friction co-efficient than the friction surfaces intermediate the clutch and the plate gripped between them, and means acting upon rotative movement of certain of the members to regulate the spring effect.

38. A vehicle spring controlling appliance comprising a plate having a friction surface, clutch mechanism mounted for rotation in relation to said plate and having a friction surface engaging the plate friction surface, said clutch mechanism including two plates and a plate frictionally gripped between them, a shifter, inclined surfaces effective between one of the clutch plates and the shifter, and spring means arranged to exert friction pressure on the plates and controlled by the shifter action.

39. A vehicle spring controlling appliance comprising a plate having a friction surface, clutch mechanism mounted for rotation in relation to said plate and having a friction surface engaging the plate friction surface, said clutch mechanism including two plates and a plate frictionally gripped between them, a spring tending to produce pressure at the friction surfaces, a heavier spring tending to produce friction pressure, and means including a shifter and co-operating inclined members intermediate the shifter and one of the clutch plates for varying the action of the springs.

40. A vehicle spring controlling appliance comprising a plate having a friction surface, clutch mechanism mounted for rotation in relation to said plate and having a friction surface engaging the plate friction surface, said clutch mechanism including two plates and a plate frictionally gripped between them, a spring tending to produce pressure at the friction surfaces, a heavier spring tending to produce friction pressure, and means including a shifter and co-operating inclined members intermediate the shifter and one of the clutch plates for reducing the pressure effect of the first spring at times and for substantially eliminating the pressure effect of the second spring at times.

41. A vehicle spring controlling appliance comprising a plate having a friction surface, clutch mechanism mounted for rotation in relation to said plate and having a friction surface engaging the plate friction surface, said clutch mechanism including two plates and a plate frictionally gripped between them, the friction surfaces intermediate the first named plate and the clutch mechanism having a different friction value from the friction surfaces intermediate the clutch plate and third plate gripped between them, spring means urging various members to frictional contact, and means acting upon rotative movement of certain of the members to regulate the spring effect and the friction pressure.

42. An appliance of the character described, comprising two members arranged for relative to-and-fro oscillation and adapted for connection to relatively movable parts of a vehicle to control the vehicle spring action, another member arranged for to-and-fro oscillation relative to both the members first mentioned, the various members having friction surfaces, a spring urging the members to produce pressure at the friction surfaces, and controlling means frictionally actuated by relative movement of certain of said members and serving to control or modify the action of said springs to vary the effective pressure at the friction surfaces under different operative conditions.

Signed at New York, in the county of New York and State of New York, this 13th day of May A. D. 1924.

RAYMOND P. LANSING.